US009429793B2

(12) United States Patent
Chen et al.

(10) Patent No.: US 9,429,793 B2
(45) Date of Patent: Aug. 30, 2016

(54) COVER FOR BACKLIGHT MODULE, BACKLIGHT MODULE, AND LIQUID CRYSTAL DISPLAY

(71) Applicant: Shenzhen China Star Optoelectronics Technology Co., Ltd., Shenzhen, Guangdong (CN)

(72) Inventors: Shihhsiang Chen, Shenzhen (CN); Gang Yu, Shenzhen (CN); Jiaqiang Wang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 231 days.

(21) Appl. No.: 13/806,885

(22) PCT Filed: Nov. 28, 2012

(86) PCT No.: PCT/CN2012/085402

§ 371 (c)(1),
(2) Date: Dec. 26, 2012

(87) PCT Pub. No.: WO2014/075356

PCT Pub. Date: May 22, 2014

(65) Prior Publication Data

US 2014/0133162 A1 May 15, 2014

(30) Foreign Application Priority Data

Nov. 14, 2012 (CN) .......................... 2012 1 0455801

(51) Int. Cl.

| | |
|---|---|
| ***G02F 1/1335*** | (2006.01) |
| ***G02F 1/1333*** | (2006.01) |
| ***F21V 8/00*** | (2006.01) |

(52) U.S. Cl.

CPC ....... *G02F 1/133608* (2013.01); *G02B 6/0093* (2013.01); *G02F 1/133308* (2013.01); *G02F 2001/133314* (2013.01); *G02F 2001/133317* (2013.01); *G02F 2201/46* (2013.01); *G02F 2201/465* (2013.01); *G02F 2201/50* (2013.01)

(58) Field of Classification Search

CPC ........... G02B 6/0093; G02F 1/133308; G02F 1/133608; G02F 2001/133314; G02F 2001/133317; G02F 2201/46; G02F 2201/465; G02F 2201/50

USPC ................................................ 362/97.1–97.4

See application file for complete search history.

(56) References Cited

U.S. PATENT DOCUMENTS 7,969,526 B2 * 6/2011 Yang ................. G02F 1/133308 349/187

2007/0236910 A1 * 10/2007 Yun ................... G02F 1/133308 362/23.18

* cited by examiner

*Primary Examiner* — Stephen F Husar
*Assistant Examiner* — Danielle Allen
(74) *Attorney, Agent, or Firm* — Andrew C. Cheng

(57) ABSTRACT

A cover of a backlight module for protecting backlight components is disclosed. The cover includes: a main body; and bent clasping sheets arranged on at least one edge portion of the main body, the clasping sheet is fixed in a groove cavity between a backplane and a front frame so as to fix the cover on the backplane. In addition, a backlight module and a liquid crystal display are disclosed. The above-mentioned cover, the backlight module, and the liquid crystal display may simplify the assembly process of the backlight module, and may reduce the cost at the same time.

13 Claims, 3 Drawing Sheets

COVER FOR BACKLIGHT MODULE, BACKLIGHT MODULE, AND LIQUID CRYSTAL DISPLAY

BACKGROUND OF THE INVENTION

This application claims priority to China Patent Application No. 201210455801.8 filed on Nov. 14, 2012 entitled, COVER FOR BACKLIGHT MODULE, BACKLIGHT MODULE, AND LIQUID CRYSTAL DISPLAY, all of the disclosures of which are incorporated herein by reference in their entirety.

1. Field of the Invention

Embodiments of the present disclosure relate to liquid crystal display technology, and more particularly to a cover for backlight module, a backlight module, and a liquid crystal display.

2. Discussion of the Related Art

Covers of backlight modules are plates for assembling with the backplane. The covers are for protecting the components in the backlight module, such as a printed circuit board. The assembly of the cover is not included in the backlight assembly process. FIG. 5 is a perspective view of a typical cover for a backlight module. The cover 9 is a rectangular cavity. The cover 9 is fixed with the backplane by the following method.

A connecting sheet 92 extends from the four corners of the cover 9, and the connecting sheet 92 is vertical to four sidewalls 91 of the cover 9. A plurality of screw holes 93 are provided on the connecting sheet 92. In addition, a plurality of screw holes is provided in the corresponding locations of the backplane.

Upon completing the above assembly, the screws pass through the screw holes 93 on the cover 9 and the screw holes on the backplane to assemble the cover 9 with the backplane. However, the typical cover has the following problems. First, the cover may only be assembled after all of the backlight components are assembled. As such, the assembly process of the whole module is complex and time-consuming. In addition, the cover needs more materials. Second, in order to strengthen the connection, more screw holes 94 are needed for the cover 9, which results in a more complex manufacturing process.

SUMMARY

The object of the claimed invention is to provide a cover for backlight module, a backlight module, and a liquid crystal display. The assembly process of the backlight module is simplified, and the material cost is reduced.

In one aspect, a cover of a backlight module for protecting backlight components includes: a main body; and bent clasping sheets arranged on at least one edge portion of the main body, the clasping sheets are fixed in a groove cavity between a backplane and a front frame so as to fix the cover on the backplane.

Wherein a fixing hole is provided on the clasping sheet; and the fixing hole aligns with screw holes on the front frame and on the backplane when the clasping sheet is inserted in the groove cavity.

Wherein the bent clasping sheets are arranged on two opposite edge portions of the main body of the cover.

Wherein the main body is substantially rectangular, and a plurality of screw holes for fixing the backplane are provided on the main body.

Wherein snaps are provided on two bending portions of the clasping sheet for engaging with slots on the backplane.

Wherein the bent clasping sheets are arranged on two opposite edge portions of the main body of the cover.

Wherein the main body is substantially rectangular, and a plurality of screw holes for fixing the backplane are provided on the main body.

In another aspect, a backlight module includes: a backplane, a front frame, a plastic frame and a cover, the backplane includes a bottom plate and a side plate vertical to the bottom plate, the front frame covers a rim of the plastic frame, the side plate of the backplane is inserted in a cavity of the plastic frame, the cover comprises: a main body; and bent clasping sheets arranged on at least one edge portion of the main body, the clasping sheets are fixed in a groove cavity between a backplane and a front frame so as to fix the cover on the backplane.

Wherein a fixing hole is provided on the clasping sheet; and screws pass through the screw hole on the front frame, the fixing holes, and the screw hole on the backplane to fix the clasping sheet in the slot.

Wherein a plurality of screw holes for fixing the backplane are provided on the main body, and the main body is fixed on the bottom plate of the backplane.

Wherein snaps are provided on two bending portions of the clasping sheet for engaging with slots on the backplane.

Wherein a plurality of screw holes for fixing the backplane are provided on the main body, and the main body is fixed on the bottom plate of the backplane.

In another aspect, a liquid crystal display includes: a backlight module comprises a backplane, a front frame, a plastic frame and a cover, the backplane includes a bottom plate and a side plate vertical to the bottom plate, the front frame covers a rim of the plastic frame, the side plate of the backplane is inserted in a cavity of the plastic frame, the cover includes: a main body; and bent clasping sheets arranged on at least one edge portion of the main body, the clasping sheets are fixed in a groove cavity between a backplane and a front frame so as to fix the cover on the backplane.

Wherein a fixing hole is provided on the clasping sheet; and screws pass through the screw hole on the front frame, the fixing holes, and the screw hole on the backplane to fix the clasping sheet in the slot.

Wherein a plurality of screw holes for fixing the backplane are provided on the main body, and the main body is fixed on the bottom plate of the backplane.

Wherein snaps are provided on two bending portions of the clasping sheet for engaging with slots on the backplane.

Wherein a plurality of screw holes for fixing the backplane are provided on the main body, and the main body is fixed on the bottom plate of the backplane.

DETAILED DESCRIPTION OF THE EMBODIMENTS

Embodiments of the invention will now be described more fully hereinafter with reference to the accompanying drawings, in which embodiments of the invention are shown.

Figure 1:
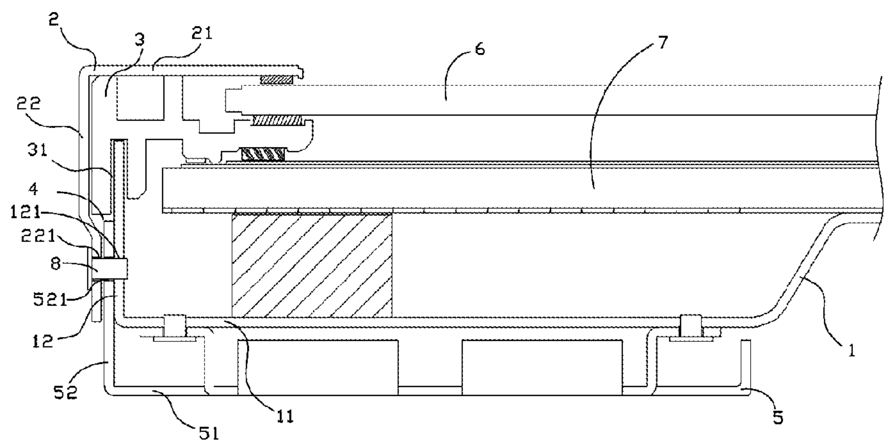
FIG. 1 is a cross-sectional view of the backlight module assembled with the cover in accordance with a first embodiment.
Figure 2:
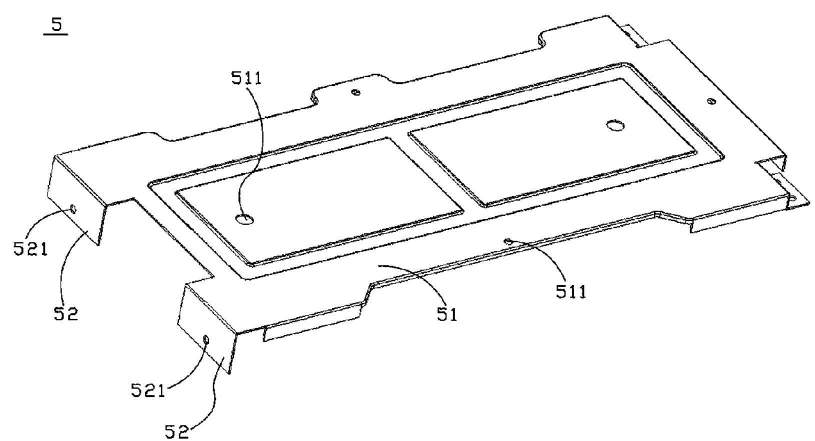
FIG. 2 is a perspective view of the cover in accordance with the first embodiment.

FIGS. 1 and 2 are schematic views of the backlight module assembled with a cover in accordance with the first embodiment.

The backlight module includes a backplane 1, a front frame 2, a plastic frame 3, and a cover 5. FIG. 1 is a cross-sectional view of the backlight module assembled with the cover.

The backplane 1 includes a bottom plate 11 and a side plate 12 vertical to the bottom plate 11. The bottom plate 11 and the side plate 12 cooperatively define an assembly space for receiving backlight components.

The backplane 1, the front frame 2, and the plastic frame 3 are assembled in turn, and then other backlight components are assembled.

Specifically, the front frame 2 is a sheet with right-angle cross section. The front frame 2 covers a rim of the plastic frame 3. A first side wall 21 of the front frame 2 and the plastic frame 3 cooperatively abut against the plastic frame 6. The first side wall 21 is substantially parallel to the backplane 1. The plastic frame 3 includes a cavity 31 for fixing the side plate 12 of the backplane 1. The cavity 31 is arranged in an edge portion of the plastic frame 3. The side plate 12 of the backplane 1 is inserted in the cavity 31. The side plate 12 and the cavity 31 cooperatively abut against backlight components 7. In the embodiment, the backlight components 7 include a diffusing plate, a prism, and a light guiding plate.

A second side wall 22 of the front frame 2 is substantially parallel to the side plate 12 of the backplane 1. A groove cavity 4 is defined by the second side wall 22 of the front frame 2 and the side plate 12 of the backplane 1 for installing the cover 5. The groove cavity 4 is a long and narrow gap for clasping the cover 5.

The structure of the groove cavity 4 and the cover 5 will be described hereafter.

FIG. 2 is a perspective view of the cover in accordance with one embodiment. The cover 5 includes a main body 51 and bent clasping sheets 52 arranged on at least one edge portion of the main body 51.

In the embodiment, the main body 51 is substantially a rectangular sheet. As shown in FIG. 2, a plurality of screw holes 511 for fixing the backplane 1 are provided on the main body 51. The screw holes 511 may be defined on the main body 51 directly without additional connecting components. In addition, as the cover 5 and the backplane 1 are assembled in advance, the number of the screw holes on the main body 51 may be greatly reduced. The assembly process is simplified while the connecting structure is reliable.

As shown, the clasping sheets 52 are arranged on the edge portion of the main body 51, and the clasping sheets 52 are spaced from each other. The clasping sheets 52 are vertical to the main body 51. In addition, the shapes of the clasping sheets 52 are the same.

A fixing hole 521 is provided on each of the clasping sheet 52. The screw holes 221, 121 are respectively provided in corresponding locations of the second side wall 22 of the front frame 2 and the side plate 12 of the backplane 1. When the clasping sheet 52 is inserted to the groove cavity 4, the fixing hole 521, the screw holes 221, 121 on the front frame 2 and the backplane 1 align with each other.

When assembling, the clasping sheet 52 is fixed in the groove cavity 4 after the screw 8 passes through the screw hole 221, the fixing hole 521, the screw hole 121. In this way, the cover 5 and the backplane 1 are assembled.

Afterward, the screw hole 511 on the main body 51 aligns with other installing holes (not shown). In this way, the connecting structure between the cover 5 and the backplane 1 are strengthened.

It is to be understood that the clasping sheets may be respectively arranged on both of the cover 5 and the backplane 1 to reduce the materials and to simply the assembly process. As such, corresponding clasping structures are not needed for the main body 51 and the backplane 1.

The structure of the cover 5 and the backplane 1 integrates the assembly of the cover 5 and the backlight module. Therefore, the assembly efficiency is enhanced.

Figure 3:
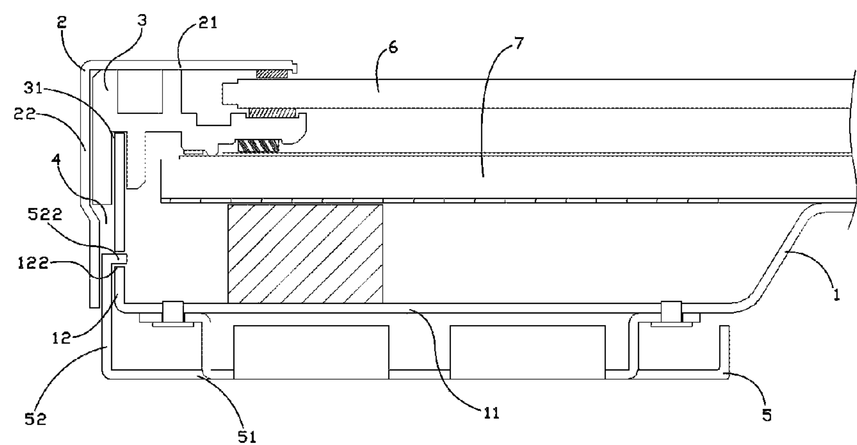
FIG. 3 is a cross-sectional view of the backlight module assembled with the cover in accordance with a second embodiment.
Figure 4:
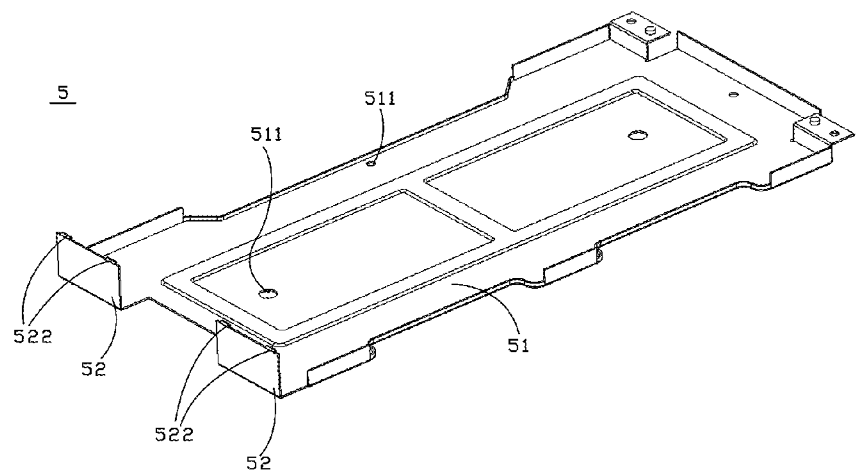
FIG. 4 is a perspective view of the cover in accordance with the second embodiment.
Figure 5:
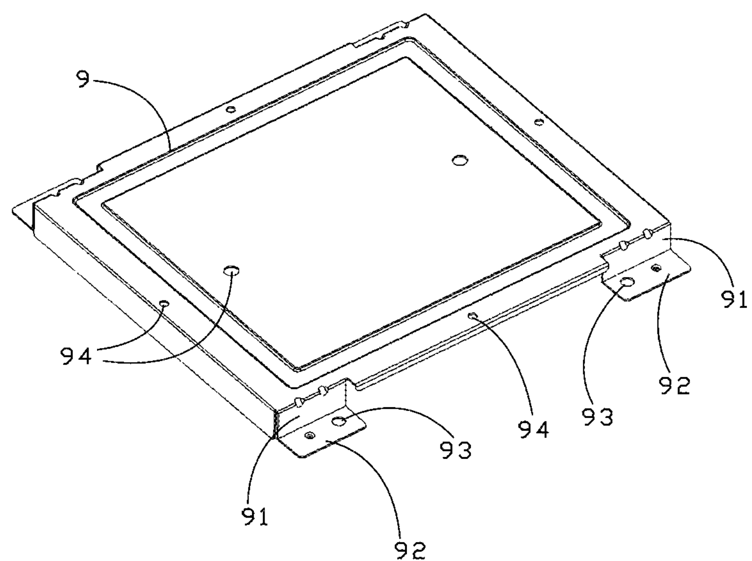
FIG. 5 is a perspective view of a typical cover for a backlight module.

FIGS. 3 and 4 show the cover for the backlight module in accordance with the second embodiment.

In the embodiment, two snaps 522 are provided on two bending portions of the clasping sheet 52. Two slots 122 are provided in corresponding locations of the side plate 12 of the backplane 1. When the clasping sheet 52 is received in the groove cavity 4, the snaps 522 engage with the slots 122 so as to assemble the cover 5 and the backplane 1.

Afterward, the screw hole 511 on the main body 51 aligns with other installing holes (not shown). In this way, the connecting structure between the cover 5 and the backplane 1 are strengthened. It is to be understood that the clasping sheets may be respectively arranged on both of the cover 5 and the backplane 1 to reduce the materials and to simply the assembly process. As such, corresponding clasping structures are not needed for the main body 51 and the backplane 1.

In one embodiment, a liquid crystal display includes the above-mentioned backlight module.

In view of the above, the cover includes clasping sheets provided on at least one edge portion of the body. The clasping sheet is fixed in the groove cavity so as to fix the backplane and the cover. As the cover and the backplane are assembled in advance, the number of screw holes may be greatly reduced. In addition, the assembly process is simplified while the connecting structure is reliable.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A cover of a backlight module for protecting backlight components, comprising:

a main body; and clasping sheets arranged on two opposite edge portions of the main body, the clasping sheets being spaced from each other, the clasping sheets are vertical to the main body, the clasping sheets are fixed in a long and narrow groove cavity cooperatively defined by a second side wall of the front frame and a side plate of a backplane so as to clasp the cover on the backplane;

wherein a fixing hole is provided on the clasping sheet; and the fixing hole aligns with the screw holes on the front frame and on the backplane when the clasping sheet is inserted in the groove cavity.

2. The cover as claimed in claim 1, wherein the main body is substantially rectangular, and a plurality of screw holes for fixing the backplane are provided on the main body.

3. The cover as claimed in claim 1, wherein snaps are provided on two bending portions of the clasping sheet for engaging with slots on the backplane.

4. The cover as claimed in claim 3, wherein the clasping sheets are arranged on two opposite edge portions of the main body of the cover.

5. The cover as claimed in claim 3, wherein the main body is substantially rectangular, and a plurality of screw holes for fixing the backplane are provided on the main body.

6. A backlight module, comprising:

a backplane, a front frame, a plastic frame and a cover, the backplane includes a bottom plate and a side plate vertical to the bottom plate, the front frame covers a rim of the plastic frame, the side plate of the backplane is inserted in a cavity of the plastic frame, and the cover comprises:

a main body; and clasping sheets arranged on two opposite edge portions of the main body, the clasping sheets being spaced from each other, the clasping sheets are vertical to the main body, the clasping sheets are fixed in a long and narrow groove cavity cooperatively defined by a second side wall of the front frame and a side plate of a backplane so as to clasp the cover on the backplane;

wherein a fixing hole is provided on the clasping sheet; and screws pass through the screw hole on the front frame, the fixing holes, and the screw hole on the backplane to fix the clasping sheet in the slot.

7. The backlight module as claimed in claim 6, wherein a plurality of screw holes for fixing the backplane are provided on the main body, and the main body is fixed on the bottom plate of the backplane.

8. The backlight module as claimed in claim 6, wherein snaps are provided on two bending portions of the clasping sheet for engaging with slots on the backplane.

9. The backlight module as claimed in claim 8, wherein a plurality of screw holes for fixing the backplane are provided on the main body, and the main body is fixed on the bottom plate of the backplane.

10. A liquid crystal display, comprising:

a backlight module comprises a backplane, a front frame, a plastic frame and a cover, the backplane includes a bottom plate and a side plate vertical to the bottom plate, the front frame covers a rim of the plastic frame, the side plate of the backplane is inserted in a cavity of the plastic frame, the cover comprises:

a main body; and clasping sheets arranged on two opposite edge portions of the main body, the clasping sheets being spaced from each other, the clasping sheets are vertical to the main body, the clasping sheets are fixed in a long and narrow groove cavity cooperatively defined by a second side wall of the front frame and a side plate of a backplane so as to clasp the cover on the backplane;

wherein a fixing hole is provided on the clasping sheet; and screws pass through the screw hold on the front frame, the fixing holes, and the screw hole on the backplane to fix the clasping sheet in the slot.

11. The liquid crystal display as claimed in claim 10, wherein a plurality of screw holes for fixing the backplane are provided on the main body, and the main body is fixed on the bottom plate of the backplane.

12. The liquid crystal display as claimed in claim 10, wherein snaps are provided on two bending portions of the clasping sheet for engaging with slots on the backplane.

13. The liquid crystal display as claimed in claim 12, wherein a plurality of screw holes for fixing the backplane are provided on the main body, and the main body is fixed on the bottom plate of the backplane.

* * * * *